United States Patent [19]
Kasari et al.

[11] Patent Number: 5,641,574
[45] Date of Patent: Jun. 24, 1997

[54] PROCESS FOR FORMING OVERCOAT

[75] Inventors: Akira Kasari; Satoshi Ikushima; Osamu Isozaki; Naoji Matsumoto, all of Kanagawa, Japan; John David Nordstrom, Huntington Woods, Mich.

[73] Assignees: E. I. Du Pont de Nemours and Company, Wilmington, Del.; Kansai Paint Company, Limited, Amagasaki, Japan

[21] Appl. No.: 553,399

[22] PCT Filed: May 24, 1993

[86] PCT No.: PCT/JP93/00678

§ 371 Date: Nov. 21, 1995

§ 102(e) Date: Nov. 21, 1995

[87] PCT Pub. No.: WO94/27741

PCT Pub. Date: Dec. 8, 1994

[51] Int. Cl.$^6$ .................................................... B05D 1/36
[52] U.S. Cl. ........................... 428/413; 427/410; 427/412.1
[58] Field of Search ................... 427/407.1, 409, 427/412.1, 410; 428/413, 414, 416, 418

[56] References Cited

U.S. PATENT DOCUMENTS

| | | | |
|---|---|---|---|
| 4,650,718 | 3/1987 | Simpson et al. | 427/407.1 |
| 4,681,811 | 7/1987 | Simpson et al. | 427/407.1 |
| 4,699,814 | 10/1987 | Ambrose et al. | 427/407.1 |
| 4,703,101 | 10/1987 | Singer et al. | 528/87 |
| 4,732,790 | 3/1988 | Blackburn et al. | 427/407.1 |
| 4,732,791 | 3/1988 | Blackburn et al. | 427/407.1 |
| 4,749,743 | 6/1988 | Ambrose et al. | 525/123 |
| 4,764,430 | 8/1988 | Blackburn et al. | 427/407.1 |

FOREIGN PATENT DOCUMENTS

| | | |
|---|---|---|
| 263429 | 4/1988 | European Pat. Off. . |
| 275138 | 7/1988 | European Pat. Off. . |

Primary Examiner—Shrive Beck
Assistant Examiner—Erma Cameron
Attorney, Agent, or Firm—Hilmar L. Fricke

[57] ABSTRACT

A process for forming an overcoat by the two-coat one-bake method wherein a base coat composition and a clear coat composition are applied to a substrate

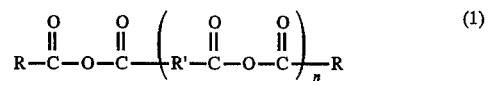

wet-on-wet and thereafter cured at the same time by heating, the process being characterized in that the base coat composition is an aqueous coating composition consisting primarily of: (I) an aqueous dispersion or solution of a polymer containing a crosslinkable functional group, (II) a crosslinking agent, (III) a coloring pigment, and (IV) water, the clear coat composition being a coating composition comprising: (A) at least one resin selected from the group consisting of (i) a resin having at least one epoxy group and at least one hydroxyl group in the molecule, (ii) a resin mixture of (ii-1) a resin having at least two epoxy groups in the molecule and (ii-2) a resin having at least two hydroxyl groups in the molecule, (iii) a resin having at least two epoxy groups in the molecule, and (iv) any mixture thereof, (B) a crosslinking agent comprising a compound having at least two noncyclic acid anhydride groups and represented by formula (1) wherein R is a monovalent hydrocarbon group having 2 to 50 carbon atoms, R' is a bivalent hydrocarbon group having 2 to 50 carbon atoms, the hydrocarbon groups R and R' containing or not containing an ether linkage, urethane linkage or ester linkage, and n is an integer of 1 to 500, and (C) a curing catalyst.

14 Claims, No Drawings

PROCESS FOR FORMING OVERCOAT

TECHNICAL FIELD

The present invention relates to a novel overcoating process wherein a base coat and a clear coat are formed by the two-coat one-bake method.

BACKGROUND ART

Motor vehicle outer panels and the like are overcoated often by the so-called two-coat one-bake method wherein a base coat composition and a clear coat composition are applied to the substrate wet-on-wet and then cured at the same time by heating.

As clear coat compositions for use in the two-coat one-bake method, thermosetting coating compositions are generally used which consist primarily of an acrylic resin or like hydroxyl-containing resin and a melamine resin.

However, air pollution due to sulfur oxides, nitrogen oxides, etc. has become aggravated on a global scale in recent years to produce an acid rain, which has developed a new drawback in the overcoat formed on motor vehicle outer panels by the two-coat one-bake method using the clear coat composition, i.e., susceptibility to etching, whitening or staining. It is urgently required to obviate this drawback. The overcoat has another drawback in that the surface thereof is subject to scratches, for example, when the motor vehicle is washed.

On the other hand, a two-coat one-bake coating process is also proposed with use of a clear coat composition which comprises an epoxy- and hydroxyl-containing resin and a cyclic anhydride serving as a crosslinking agent (U.S. Pat. Nos. 4,732,790 and 4,732,791). This coating process gives coatings that have inferior scratch resistance and do not always have satisfactory acid resistance.

The present invention provides a novel two-coat one-bake coating process for forming overcoats that are free of the foregoing deficiencies of the prior art and form overcoats that have excellent acid and scratch resistance.

SUMMARY OF THE INVENTION

The present invention provides a process for forming an overcoat by the two-coat one-bake method wherein a base coat composition and a clear coat composition are applied to a substrate wet-on-wet and thereafter cured at the same time by heating, the process being characterized in that the base coat composition is an aqueous coating composition consisting primarily of:

(I) an aqueous dispersion or solution of a polymer containing a crosslinkable functional group, (II) a crosslinking agent, (III) a coloring pigment, and (IV) water, the clear coat composition being a coating composition comprising:

(A) at least one resin selected from the group consisting of (i) a resin having at least one epoxy group and at least one hydroxyl group in the molecule, (ii) a resin mixture of (ii-1) a resin having at least two epoxy groups in the molecule and (ii-2) a resin having at least two hydroxyl groups in the molecule, (iii) a resin having at least two epoxy groups in the molecule, and (iv) an any mixture thereof, (B) a crosslinking agent comprising a compound having at least two noncyclic acid anhydride groups and represented by the formula

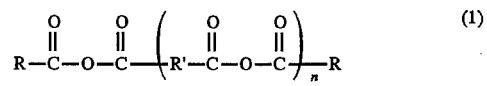

wherein R is a monovalent hydrocarbon group having 2 to 50 carbon atoms, R' is a bivalent hydrocarbon group having 2 to 50 carbon atoms, the hydrocarbon groups R and R' containing or not containing an ether linkage, urethane linkage or ester linkage, and n is an integer of 1 to 500, and (C) a curing catalyst.

DETAILED DESCRIPTION OF THE INVENTION

Intensive research has been conducted to overcome the deficiencies of the prior art and it has been found that cured coatings which have excellent acid and scratch resistance are obtained by conducting the two-coat one-bake method using as a clear coat composition a coating composition comprising an epoxy- or epoxy- and hydroxyl-containing resin, a crosslinking agent which is a compound having noncyclic acid anhydride groups and represented by the formula (1), and a curing catalyst.

The substrates to be overcoated by the process of the invention include those of various metals and plastics. Preferably, the substrate has its surface treated by a usual chemical conversion process before coating. Examples of such substrates are outer panels of motor vehicles, outer panels of household electric devices, outer panels of office machines, building materials, etc.

Further preferably, the substrate is coated with a primer coating composition, or with a primer coating composition and an intermediate coating composition before overcoating. Examples of useful primer coating compositions are organic solvent or water based compositions and powder compositions which can be cured by crosslinking or dried at room temperature and which consist primarily of an epoxy resin, alkyd resin, vinyl resin or the like. Electrophoretic coating compositions are suitable as such compositions for substrates of metals. Examples of useful intermediate coating compositions are organic solvent or water based compositions which can be cured by crosslinking or dried at room temperature and which consist primarily of an alkyd resin, polyester resin or acrylic resin.

The base coat and clear coat compositions to be used in the present process will be described below.

The base coat composition is an aqueous coating composition consisting primarily of:

(I) an aqueous dispersion or solution of a polymer containing a crosslinkable functional group, (II) a crosslinking agent, (III) a coloring pigment, and (IV) water.

Polymers suitable for the component (I) of the base coat composition include a water-dispersible or water-soluble acrylic polymer and polyester polymer containing a crosslinkable functional group. Preferred among them is an aqueous dispersion of a finely particulate acrylic polymer.

The aqueous dispersion (I) of a finely particulate acrylic polymer containing a crosslinkable functional group for use in the base coat composition can be one of those already known, such as those disclosed, for example, in Unexamined Japanese Patent Publications No. 193968/1998 and No. 97564/1990. These dispersions include, for example, an aqueous dispersion of finely particulate acrylic polymer which is generally about 0.02 to about 1 μm, especially 0.03 to 0.5 μm, in mean particle size and which is prepared by polymerizing at least one acrylic monomer, along with other copolymerizable monomer when required, in the presence of a dispersion stabilizer such as a polyoxyethylene nonyl phenyl ether or like nonionic surfactant, a polyoxyethylene alkyl allyl ether sulfuric acid ester salt or like anionic surfactant, or an acrylic resin having an acid value of about 20 to about 150 and a number average molecular weight of about 5,000 to about 30,000 or like water-soluble resin.

The particulate acrylic polymer has at least one functional group which is reactive with the crosslinking agent (II) for crosslinking and which is selected, for example, from among hydroxyl group, glycidyl group and amino group.

Examples of acrylic monomers useful for preparing the particulate acrylic polymer are (meth)acrylic acid; carboxyalkyl (meth)acrylates such as 2-carboxyethyl (meth)acrylate; and monoesters of (meth)acrylic acid and a monohydric alcohol having 1 to 22 carbon atoms, such as methyl (meth)acrylate, ethyl (meth)acrylate, propyl (meth)acrylate, n-butyl (meth)acrylate, isobutyl (meth)acrylate and 2-ethylhexyl (meth)acrylate. At least one of these monomers is usable.

Examples of polymerizable monomers containing a crosslinkable functional group useful for introducing such a group into the particulate polymer are hydroxyalkyl esters of (meth)acrylic acid such as hydroxyethyl (meth)acrylate, hydroxypropyl (meth)acrylate and hydroxybutyl (meth)acrylate; (meth)acrylamides such as (meth)acrylamide, N-propoxymethyl (meth)acrylamide and N-butoxymethyl (meth)acrylamide; glycidyl (meth)acrylate; etc. These monomers can be used singly, or at least two of them are usable in combination.

The above-mentioned other copolymerizable monomer is a monomer other than the acrylic monomers and the monomers having a functional group which are given above. Examples of such monomers are styrene, derivatives thereof, vinyl chloride, vinyl acetate, acrylonitrile, fluorine-containing polymerizable monomers, etc.

Although the proportions of different monomers to be used for preparing the particulate polymer can be determined as desired in accordance with the contemplated purpose, it is suitable to use 1 to 99 wt. %, preferably 10 to 90 wt. %, of acrylic monomer, 1 to 60 wt. %, preferably 2 to 40 wt. %, of the monomer having a crosslinkable functional group, and 99 to 0 wt. %, preferably 88 to 0 wt. %, of other copolymerizable monomer based on the total amount by weight of the monomers.

The aqueous dispersion (I) of finely particulate acrylic polymer to be used can be a dispersion of the core/shell type prepared by a multistage polymerization process. For example, a multistage polymerization emulsion is useful which is obtained by initially preparing an emulsion polymer (core portion) from an acrylic monomer containing a small amount of or no α,β-ethylenically unsaturated acid, and subsequently copolymerizing an acrylic monomer (shell portion) containing a large amount of α,β-ethylenically unsaturated acid with the polymer. The emulsion thus prepared is desirable because it can be given an increased viscosity when neutralized with a neutralizing agent to prevent the resulting composition from sagging or producing irregularities in coatings. Examples of neutralizing agents which are usable are ammonia, and water-soluble amino compounds such as monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine, propylenediamine, methylethanolamine, dimethylethanolamine, diethylethanolamine, 2-amino-2-methylpropanol, morpholine and the like, among which triethylamine, dimethylethanolamine and 2-amino-2-methylpropanol are especially desirable.

When the aqueous dispersion (I) of finely particulate acrylic polymer must be excellent in properties such as mechanical stability and storage stability, it is desired that the dispersion comprise particles which are three-dimensionally crosslinked in the interior. Such particles can be prepared by a known process, for example, by using a small amount of polyfunctional monomer, or (meth)acrylic acid and glycidyl (meth)acrylate in combination therewith, as included in the monomers for forming the particulate polymer. Examples of useful polyfunctional monomers are monomers having at least two polymerizable double bonds in the molecule, such as divinylbenzene, ethylene glycol di(meth)acrylate, 1,6-hexanediol di(meth)acrylate, trimethylolpropane di(meth)acrylate, allyl (meth)acrylate and trimethylolpropane triacrylate.

Suitable as the crosslinking agent (II) to be incorporated into the base coat composition for use in the process of the invention is a known melamine resin which is capable of forming a crosslinked structure by reacting with the hydroxyl group or like crosslinkable functional group present in the aqueous dispersion or solution (I).

Such melamine resins are divided into hydrophilic melamine resins and hydrophobic melamine resins. The resin desired for the contemplated purpose is optionally selected from among these resins, while melamine resins of both types can be used in combination.

Useful hydrophilic melamine resins are those which are greater than 20 in the ratio of dilution with a water/methanol mixture solvent (35/65 in weight ratio) and less than 800 in weight average molecular weight and which are modified with an alcohol having a small number of carbon atoms, for example, up to four carbon atoms, such as methyl alcohol, ethyl alcohol, propyl alcohol or butyl alcohol and may have an imino, methylol or like polar group. Examples of such resins are Cymel 303, 325, 350 and 370 (brand names, products of American Cyanamide Co.). These hydrophilic melamine resins make it possible to form coatings having an excellent appearance on finishing and free of sagging or mottling, further giving high storage stability to the base coat composition.

To give coatings having high water resistance, it is effective to use, as dispersed in water in the presence of a water-soluble resin, a hydrophobic melamine resin which is in the range of 0.1 to 20 in the ratio of dilution with a water/methanol mixture solvent (35/65 in weight ratio) and 800 to 4,000 in weight average molecular weight. It is desirable to use this resin in combination with the hydrophilic melamine resin in order to improve the storage stability of the base coat composition and to give coatings which are satisfactory in both appearance and water resistance.

These hydrophobic or hydrophilic melamine resins are usable singly or hydrophobic and hydrophilic melamine resins can be used in combination. When the resins are used in combination, the weight ratio of the hydrophilic melamine resin to the hydrophobic melamine resin to be mixed therewith is preferably 5-95 to 95-5, more preferably 20-80 to 80-20.

The hydrophobic melamine resin to be used is not limited specifically insofar as the above requirement is fulfilled. Examples of such resins usable are those disclosed in Unexamined Japanese Patent Publication No. 193968/1988. More specifically, examples of useful resins are those modified with an alcohol such as methyl alcohol, ethyl alcohol, isopropyl alcohol, n-butyl alcohol, isobutyl alcohol, octyl alcohol, 2-ethylhexyl alcohol or benzyl alcohol, preferably with an alcohol having at least four carbon atoms, more preferably with a $C_4$ to $C_7$ alcohol, and containing up to about 5 moles, preferably about 1.5 to about 3 moles, of ether groups per triazine ring, these resins being used as dispersed in water in the presence of a water-soluble resin. Examples of useful melamine resins include full-etherified melamine resins such as Cymel 1161 (brand name, product of American Cyanamide Co.).

The water-soluble resin to be used as a dispersion stabilizer for the hydrophobic melamine resin is, for example, a carboxyl-containing resin, such as acrylic resin, alkyd resin, epoxy resin or urethane resin, as neutralized and thereby made soluble in water. The ratio of the dispersion stabilizer (water-soluble resin) to the hydrophobic melamine resin is preferably 1 to 10 parts by weight, more preferably 3 to 7 parts by weight, of the former per 10 parts by weight of the latter.

The ratio of dilution with the solvent is an index indicating the solubility of the malamine resin in a hydrophilic solvent. The smaller the index, the greater is the hydrophobicity. The ratio is determined by placing 2 g of the melamine resin into a 50-c.c. beaker, placing the beaker on paper printed with No. 5 types, and subsequently adding a water/methanol mixture solvent (35/65 in weight ratio) dropwise to the resin with stirring at 25° C. until the print becomes illegible. The value (c.c./g) obtained by dividing the amount (c.c.) of the solvent added by the amount of the melamine resin is expressed as the ratio (dilution ratio).

Coloring pigments (III) useful for the base coat composition for use in the process of the invention include metallic pigments and coloring pigments which are used in the field of usual coating compositions. Examples of useful metallic pigments are aluminum flakes, copper bronze flakes, colored mica powder, etc. Examples of useful coloring pigments are inorganic pigments such as titanium dioxide, iron oxide, chromium oxide, lead chromate and carbon black; and organic pigments such as phthalocyanine blue, phthalocyanine green, carbazole violet, anthrapyrimidine yellow, flavanthrone yellow, isoindoline yellow, indanthrone blue and quinacridone violet. These pigments can be used singly, or at least two of them are usable in combination. Preferably, the pigment is dispersed in a water-soluble resin before use. It is desirable to use 5 to 20 parts by weight of the water-soluble resin per 10 parts by weight of the pigment.

The aqueous base coat composition for use in the present invention consists primarily of the aqueous dispersion or solution (I), crosslinking agent (II), coloring pigment (III) and water (IV) as described above. Although the ratio of these components can be determined as desired, it is desirable to use, for example, 10 to 70 parts by weight, more desirably 15 to 50 parts by weight, of the crosslinking agent (II) and 2 to 200 parts by weight, more desirably 3 to 150 parts by weight, of the coloring pigments (III) per 100 parts by weight of the aqueous dispersion or solution (I) calculated as solids.

Furthermore, a modified polyester resin (V) can be incorporated into the base coat composition in addition to the components (I) to (IV). Preferably, the resin (V) is a modified polyester resin which is obtained by polymerizing a polyester resin (a) containing a radically polymerizable unsaturated group with a mixture (b) of an ethylenically unsaturated carboxylic acid and other polymerizable unsaturated monomer, and which has an acid value of 8 to 200 and a hydroxyl value of 10 to 300.

The polyester resin (a) containing a radically polymerizable unsaturated group and present in the component (V) can be obtained, for example, by reacting at least one monomer selected from among an epoxy-containing radically polymerizable unsaturated monomer (i), isocyanate-containing radically polymerizable unsaturated monomer (ii) and acid anhydride group-containing polymerizable unsaturated monomer (iii) with a polyester resin containing a carboxyl group and hydroxyl group, i.e., with the carboxyl group and/or the hydroxyl group of the polyester resin, so that substantially no epoxy, isocyanate or acid anhydride group remains.

The carboxyl- and hydroxyl-containing polyester resin can be prepared, for example, by reacting a polybasic acid having at least two carboxyl groups in the molecules, such as phthalic acid, isophthalic acid, terephthalic acid, maleic acid, pyromellitic acid, adipic acid or cyclohexyldicarboxylic acid, with a polyhydric alcohol having at least two hydroxyl groups, such as (poly)ethylene glycol, (poly)propylene glycol, neopentyl glycol, 1,6-hexanediol, cyclohexyldimethanol, trimethylolpropane, pentaerythritol, glycerin or tricyclodecanedimethanol, in the known manner so that the resulting polyester resin contains both carboxyl and hydroxyl groups. When required, the polyester resin may be modified with castor oil fatty acid, coconut oil fatty acid, cotton oil fatty acid or like fatty acid or benzoic acid as a portion of the acid component.

The epoxy-containing unsaturated monomer (i) which can be reacted with the polyester resin is a monomer containing one epoxy group and one radically polymerizable unsaturated group in the molecule. Examples of such monomers are glycidyl (meth)acrylate, ally glycidyl ether, 3,4-epoxycyclohexylmethyl (meth)acrylate, etc.

The isocyanate-containing unsaturated monomer (ii) is a monomer having one isocyanate group and one radically polymerizable unsaturated group in the molecule. Examples of such monomers are isocyanate ethyl (meth)acrylate, $\alpha,\alpha$-dimethyl-m-isopropenylbenzyl isocyanate and like monoisocyanate compounds; reaction product of one mole of a hydroxyl-containing radically polymerizable unsaturated monomer (such as hydroxyethyl (meth)acrylate or hydroxypropyl (meth)acrylate) and one mole of a polyisocyanate compound (such as isophorone diisocyanate); etc.

The acid anhydride group-containing unsaturated monomer (iii) is a compound having one acid anhydride group and one radically polymerizable unsaturated group in the molecule. Examples of such monomers are maleic anhydride, itaconic anhydride, succinic anhyride and like unsaturated dicarboxylic acid anhydrides.

The amount of at least one of the unsaturated monomers (i) to (iii) to be reacted with the carboxyl- and hydroxyl-containing polyester resin is mot limited strictly but is suitably variable. To be suitable, it is generally 0.2 to 5 moles, preferably 0.3 to 3 moles, per molecule of the polyester resin. This reaction can be carried out in a hydrophilic organic solvent usually at a temperature of about 80° to 150° C. for about 1 to about 8 hours.

Examples of hydrophilic solvents usable for the reaction are ethylene glycol, ethylene glycol monoalkyl ethers (such as methyl, ethyl and butyl ethers), diethylene glycol, diethylene glycol monoalkyl ethers (such as methyl, ethyl and butyl ethers), glyme solvents (such as ethylene glycol dimethyl ether), diglyme solvents (such as diethylene glycol dimethyl ether), alcoholic solvents (such as methyl alcohol, ethyl alcohol, propyl alcohol and n-butyl alcohol), propylene glycol, propylene glycol monoalkyl ethers (such as methyl, ethyl and butyl ethers), dipropylene glycol, dipropylene glycol monoakyl ethers (such as methyl, ethyl and butyl ethers), etc. These solvents can be used singly, or in admixture.

The radically polymerizable unsaturated group-containing polyester resin (a) is polymerized with the mixture (b) of ethylenically unsaturated carboxylic acid and other copolymerizable unsaturated monomer. Consequently, a modified polyester resin is eventually obtained which is in the form of a polymer of the polyester resin (a) and the monomer mixture (b) grafted thereto by the polymerization of the monomers of the mixture (b) and by the reaction of the monomers and/or the resulting polymer of the monomers with the polyester resin (a).

The graft polymerization can be conducted by the known solution polymerization process with use of the above mentioned hydrophilic solvent in the presence of a suitable polymerization catalyst at a temperature of about 60° to about 150° C.

The ratio of the component (a) to the component (b) to be reacted therewith is variable over a wide range in accordance with the desired properties of the modified polyester resin to be produced. The (a)/(b) ratio by weight can generally be in the range of 20/80 to 90/10, preferably 30/70 to 80/20.

On the other hand, the ratio of the ethylenically unsaturated carboxylic acid in the component (b) to the other copolymerizable unsaturated monomer therein is dependent on the acid value of the modified polyester resin to be produced. The ethylenically unsaturated carboxylic acid/other copolymerizable unsaturated monomer ratio by weight is generally in the range of 2/98 to 30/70, preferably 3/97 to 25/75, to be suitable.

The ethylenically unsaturated carboxylic acid to be used in the component (b) can be, for example, (meth)acrylic acid, 2-carboxyethyl (meth)acrylic acid, maleic acid, fumaric acid, itaconic acid or a half-esterified product of maleic acid or fumaric acid. Among these, (meth)acrylic acid is favorable. Other copolymerizable unsaturated monomers usable are the same as those exemplified as acrylic and other copolymerizable monomers for the preparation of the aqueous dispersion (I) of finely particulate acrylic polymer. Suitable examples of such monomers are alkyl or cycloalkyl esters of (meth)acrylic acid such as methyl (meth)acrylate, ethyl (meth)acrylate, propyl (meth)acrylate, butyl (meth)acrylate, hexyl (meth)acrylate, lauryl (meth)acrylate and cyclohexyl (meth)acrylate; vinyl aromatic compounds such as styrene and vinyltoluene; (meth)acrylonitrile compounds such as (meth)acrylonitrile; hydroxyl-containing polymerizable unsaturated monomers such as hydroxyethyl (meth)acrylate, hydroxypropyl (meth)acrylate and like hydroxyalkyl esters of (meth)acrylic acid; etc. These monomers can be used singly, or at least two of them are usable in combination.

When the mixture prepared from the polyester resin (a) and the monomer mixture (b) for polymerization contains less than 20 wt. % of polyester resin (a), the coating obtained is liable to exhibit an impaired finish and lower chipping resistance and nonsanding recoat adhesion, whereas if the amount of polyester resin (a) is over 90 wt. %, the coating tends to exhibit an impaired appearance and lower water resistance. Further if the proportion of the ethylenically unsaturated carboxylic acid in the mixture (b) is less than 2 wt. %, the resin produced is prone to exhibit lower dispersibility in water and to give poor storage stability to the resulting coating, whereas when the proportion of the acid is in excess of 30 wt. %, the coating tends to show lower water resistance.

The modified polyester resin (V) can be of an acid value in the range of 8 to 200, preferably 8 to 150, more preferably 10 to 50. The modified polyester resin needs to have hydroxyl to undergo a crosslinking reaction with crosslinking agent (II). The hydroxyl may be present in the polyester resin (a) or may be introduced into the polyester resin (V) by using a hydroxyl-containing unsaturated monomer as a portion of the monomer in the monomer mixture (b). The hydroxyl content of the modified polyester resin is 10 to 300, preferably 30 to 200, more preferably 30 to 150, in terms of hydroxyl value. The modified polyester resin can be about 500 to about 20,000, preferably 1,000 to 10,000, in number average molecular weight.

The modified polyester resin (V) thus obtained is dispersed, as it is or with the solvent distilled off, in water and thereby made into an aqueous dispersion thereof. The aqueous dispersion can be prepared in the usual manner, for example, by neutralizing the carboxyl group in the modified polyester resin with about 0.3 to about 1.5 equivalent weights of a known basic substance serving as a neutralizing agent.

Basic compounds usable for neutralization are the same as the neutralizing agents previously mentioned for use in giving an increased viscosity to the aqueous dispersion (I) of particulate acrylic polymer.

To be suitable, the proportions of the modified polyester resin (V) and the aqueous dispersion or solution (I) for use in the base coat composition of the invention are 90 to 10 wt. %, preferably 80 to 20 wt. %, of the component (V) and 10' to 90 wt. %, preferably 20 to 80 wt. %, of the component (I) based on the combined amount by weight of the two components (V) and (I) calculated as solids. When the proportion of the component (I) is less than 10 wt. %, that is, when the proportion of the component (v) is in excess of 90 wt. %, the coating is liable to sag with a tendency of the metallic pigment to exhibit impaired orientation. On the other hand, when the proportion of the component (I) is more than 90 wt. %, that is, when the proportion of the component (V) is less than 10 wt. %, the coating formed from a high solids base coat composition tends to exhibit impaired surface smoothness and is unlikely to exhibit improved properties in respect of chipping resistance and nonsanding recoat adhesion.

When incorporating the modified polyester resin (V), the base coat composition is smoothly applicable and forms coatings having high surface smoothness, i.e., a satisfactory finish, even if having a high solids concentration of 25 to 45 wt. % when to be applied. Since the base coat composition has suitable pseudoplasticity or thixotropy, the composition forms coatings free from faults such as sagging or mottling even at high humidities and having high chipping resistance and excellent nonsanding recoat adhesion.

A urethane resin emulsion (VI) can further be admixed with the aqueous composition consisting primarily of the foregoing components (I), (II), (III) and (IV) to prepare a base coat composition for use in the present invention. The emulsion (VI) can also be used together with the modified polyester resin (V).

The urethane resin emulsion (VI) is already known and mentioned as an example in Unexamined Japanese Patent Publication No. 289630/1990, etc.

The emulsion (VI) is prepared from a urethane prepolymer which comprises (i) an aliphatic and/or alicyclic diisocyanate, (ii) a polyether diol and/or polyester diol having a number average molecular weight of 500 to 5,000, (iii) a low-molecular-weight polyhydroxyl compound and (iv) a dimethylolalkanoic acid and which is prepared by reacting these components at an NCO/OH equivalent ratio of 1.1 to 1.9. The prepolymer is neutralized with a primary, secondary or tertiary amine, and subjected to chain extension with water and emulsified in water after or during the neutralization to give a self-emulsified urethane emulsion, i.e., the emulsion (VI). More specifically, the urethane prepolymer is prepared by subjecting the components (i) to (iv) to a one-shot or multistage polymerization process at a NCO/OH equivalent ratio of 1.1 to 1.9. The prepolymer is mixed with water after or during neutralization with an amine and is thereby subjected to a chain extension reaction with the water while being emulsified and dispersed in the water at the same time. When required, the organic solvent is distilled off from the dispersion. The procedure described affords an aqueous dispersion (VI) of self-emulsifiable urethane resin which is about 0.001 to about 1.0 μm in mean particle size.

Examples of aliphatic diisocyanates and aliphatic diisocyanates useful for preparing the urethane prepolymer are aliphatic diisocyanates having 2 to 12 carbon atoms such as hexamethylene diisocyanate, 2,2,4-trimethylhexane diisocyanate and lysine diisocyanate; alicyclic diisocyanates having 4 to 18 carbon atoms such as 1,4-cyclohexane diisocyanate, 1-isocyanato-3-isocyanatomethyl-3,5,5-trimethylcyclohexane (isophorone diisocyanate), 4,4'-dicyclohexylmethane diisocyanate, methylcyclohexylene diisocyanate and isopropylidene dicyclohexyl-4,4'-diisocyanate; modified products of these diisocyanates (such as those containing carbodiimide, uretdione, uretone imine or the like); and mixtures of at least two of them; etc. Among them, preferred are alicyclic diisocyanates, especially 1,4-cyclohexane diisocyanate, 1-isocyanato-3-isocyanatomethyl-3,5,5-trimethylcyclohexane and 4,4'-dicyclohexylmethane diisocyanate.

Use of aromatic diisocyanate as the component (i) tends to cause the discoloration of coating due to exposure to ultraviolet light, hence undesirable.

Examples of the component (ii) for use in the preparation of the urethane prepolymer, i.e., polyether diols and polyester diols both having a number-average molecular weight of 500 to 5,000, preferably 1,000 to 3,000, include those prepared by polymerizing or copolymerizing (block or random copolymerization) alkylene oxide (such as ethylene oxide, propylene oxide, butylene oxide or the like) and/or a heterocyclic ether (such as tetrahydrofuran or the like), examples of the resulting polymers being polyethylene glycol, polypropylene glycol, polyethylene-propylene (block or random) glycol, polytetramethylene ether glycol, polyhexamethylene ether glycol and polyoctamethylene ether glycol; condensation polymers of dicarboxylic acid (such as adipic acid, succinic acid, sebacic acid, glutaric acid, maleic acid, fumaric acid, phthalic acid or the like) with glycol (such as ethyelene glycol, propylene glycol, 1,4-butanediol, 1,6-hexanediol, 3-methyl-1,5-pentanediol, neopentyl glycol, bishydroxymethylcyclohexane or the like), examples of the condensation polymers being polyethylene adipate, polybutylene adipate, polyhexamethylene adipate, polyneopentyl adipate, poly-3-methylpentyl adipate, polyethylene/butylene adipate and polyneopentyl/hexyl adipate; polylactone diols such as polycaprolactone diol and poly-3-methylvalerolactone diol; polycarbonate diols; mixtures of at least two of them; etc.

Examples of the component (iii) for use in the preparation of the urethane prepolymer, i.e., low-molecular-weight polyhydroxyl compounds, include those having a number average molecular weight of less than 500, e.g. glycols as exemplified above as the material for the polyester diol and low-molecular-weight addition products (molecular weight of below 500) of the glycol with alkylene oxide; trihydric alcohols such as glycerin, trimethylol ethane, trimethylol propane and the like and low-molecular-weight addition products (molecular weight of less than 500) of the alcohol with alkylene oxide; mixtures of at least two of them; etc. The low-molecular-weight polyhydroxyl compound is used usually in an amount of 0.1 to 20% by weight, preferably 0.5 to 10% by weight, based on the polyether diol or polyester diol.

Examples of the component (iv) for use in the preparation of the urethane, i.e., dimethylolalkanoic acid, include dimethylolacetic acid, dimethylolpropionic acid, dimethylolbutyric acid, etc. among which dimethylolpropionic acid is preferred. The dimethylolalkanoic acid is used in an amount of 0.5 to 5% by weight, preferably 1 to 3% by weight (calculated as the carboxyl group (—COOH)), based on the urethane prepolymer prepared by reacting the components (i) to (iv). If the amount of carboxyl group is less than 0.5% by weight, it is difficult to prepare a stable emulsion. However, if the amount exceeds 5% by weight, the hydrophilic property is increased, rendering the emulsion highly viscous and decreasing the water resistance of coating.

Amines useful as neutralizing agents include primary amines and secondary amines. Examples of such amines are ammonia; lower alkylamines such as methylamine, ethylamine, isopropylamine, n-butylamine, dimethylamine, diethylamine, diisopropylamine and di-n-butylamine; alicyclic amines such as cyclohexylamine; heterocyclic amines such as morpholine and pyridine; alkanolamines such as monoethanolamine, diethanolamine, monoisopropanolamine, diisopropanolamine, methylethanolamine, methylpropanolamine and methylisopropanolamine; etc. Examples of useful tertiary amines are trialkylamines such as trimethylamine, triethylamine, triisopropylamine, tri-n-propylamine, and tri-n-butylamine; N-alkylmorpholines such as N-methylmorpholine and N-ethylmorpholine; N-dialkylalkanolamines such as N-dimethylethanolamine and N-diethylethanolamine; etc.

The amount of amine to be used is usually 0.5 to 1.5 equivalent weights, preferably 0.7 to 1.3 equivalent weights, per equivalent of carboxyl.

The amount of the urethane resin emulsion (VI) to be used is suitably 90 to 10 wt. %, preferably 80 to 20 wt. %, based on the combined amount by weight of the components (I) and (VI) calculated as solids.

Use of the urethane resin emulsion (VI) provides coatings which are further improved in chipping resistance and recoat adhesion.

Besides the components described above, suitable ultraviolet absorbers, photostabilizers, surfactants, defoaming agents, curing catalysts and like additives can be incorporated into the base coat composition for use in the present invention when so required.

The base coat composition for use in the present invention can be prepared, for example, by mixing the components together into a dispersion in a known manner, and adding deionized water to the dispersion to a solids concentration of 10 to 45 wt. %, preferably about 20 to about 40 wt. %, and to a viscosity of 800 to 5,000 cps/6 r.p.m., preferably about 200 to about 3,000 cps/6 r.p.m. (Brookfield viscometer).

The clear coat composition for use in the process of the present invention is a coating composition comprising:

(A) at least one resin selected from the group consisting of (i) a resin having at least one epoxy group and at least one hydroxyl group in the molecule, (ii) a resin mixture of (ii-1) a resin having at least two epoxy groups in the molecule and (ii-2) a resin having at least two hydroxyl groups in the molecule, (iii) a resin having at least two epoxy groups in the molecule, and (iv) an any mixture thereof, (B) a crosslinking agent comprising a compound having at least two noncyclic acid anhydride groups and represented by the formula

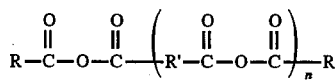 (1)

wherein R is a monovalent hydrocarbon group having 2 to 50 carbon atoms, R' is a bivalent hydrocarbon group having 2 to 50 carbon atoms, the hydrocarbon groups R and R' containing or not containing an ether linkage, urethane linkage or ester linkage, and n is an integer of 1 to 500, and (c) a curing catalyst.

These components will be described in detail below.

The component (A) of the clear coat composition is at least one resin selected from the group consisting of (i) a resin having at least one epoxy group and at least one hydroxyl group in the molecule, (ii) a resin mixture of a resin having at least two epoxy groups in the molecule and a resin having at least two hydroxyl groups in the molecule, (iii) a resin having at least two epoxy groups in the molecule, and (iv) an any mixture thereof.

Preferred examples of resins (i) having at least one epoxy group and at least one hydroxyl group in the molecule are those having at least one epoxy group and at least one hydroxyl group attached to the end and/or side chain of the skeleton of a base resin such as a polyester resin, acrylic resin, polyurethane resin or epoxy resin. These examples include hydroxyl-containing bisphenol-type epoxy resins; acrylic resins consisting essentially of a glycidyl-containing vinyl monomer (such as glycidyl acrylate, glycidyl methacrylate, 3,4-epoxycyclohexylmethyl acrylate or 3,4-epoxycyclohexylmethyl methacrylate) and a hydroxyl-containing vinyl monomer (such as hydroxyethyl acrylate, hydroxyethyl methacrylate, hydroxypropyl acrylate or hydroxypropyl methacrylate), and when required, further comprising a vinyl monomer copolymerizable with these monomers; resins obtained by the addition of a compound having hydroxyl and glycidyl (such as glycidol) and a compound having two hydroxyl groups (such as ethylene glycol or diethylene glycol) to a polyurethane resin having free isocyanate by urethanization; etc.

It is required that the resin (i) have at least one epoxy group and at least one hydroxyl group in the molecule, the number of these groups being preferably 2 to 50. An amino, amide or like functional group may be present conjointly with these groups. The resin (i) is preferably about 300 to about 100000, more preferably about 4000 to about 50000, in number average molecular weight (as determined by GPC).

The resin mixture (ii) is composed of a resin (ii-1) having at least two epoxy groups in the molecule and a resin (ii-2) having at least two hydroxyl groups in the molecule. These component resins are as follows.

Stated more specifically, the resin (ii-1) having at least two epoxy groups in the molecule is a resin having at least two epoxy groups attached to the end and/or side chain of the skeleton of a base resin such as epoxy resin, polyester resin, acrylic resin or polyurethane resin. The resin is free from hydroxyl. Examples of such resins are bisphenol-type or novolak-type epoxy resins; acrylic resins consisting essentially of a glycidyl-containing vinyl monomer (such as glycidyl acrylate, glycidyl methacrylate, 3,4-epoxycyclohexylmethyl acrylate or 3,4-epoxycyclohexylmethyl methacrylate), and when required, further comprising a vinyl monomer copolymerizable with the monomer; resins prepared by the addition of a compound having hydroxyl and glycidyl, such as glycidol, to a polyurethane resin having free isocyanate by urethanization; and phenoxy resins.

Although it is required that the resin (ii-1) have at least two, preferably 2 to 50, epoxy groups in the molecule, the resin may contain a functional group, such as amino or amide, conjointly with the epoxy groups. The component (ii-1) is preferably about 300 to about 100000, more preferably about 3000 to about 50000, in number average molecular weight (as determined by GPC).

Specifically stated, the resin (ii-2) having at least two hydroxyl groups in the molecule is a resin which has at least two hydroxyl groups attached to the end and/or side chain of the skeleton of a base resin such as polyester resin, acrylic resin, polyurethane resin or epoxy resin, and which is free from epoxy. Examples of useful resins (ii-2) are hydroxyl-containing acrylic resins consisting essentially of a hydroxyl-containing vinyl monomer (such as hydroxyethyl acrylate, hydroxyethyl methacrylate, hydroxypropyl acrylate or hydroxypropyl methacrylate), and when required, further comprising a vinyl monomer copolymerizable with the monomer; resins prepared by the addition of a compound having two hydroxyl groups (such as ethylene glycol or diethylene glycol) to a polyurethane resin having free isocyanate by urethanization; polyether polyols; etc.

Although it is required that the resin (ii-2) have at least two, preferably 2 to 50, hydroxyl groups in the molecule, the resin may further have a functional group, such as amino or amide, conjointly with the hydroxyl groups. The component (ii-2) is preferably about 300 to about 100000, more preferably about 5000 to about 50000, in number average molecular weight (as determined by GPC).

The proportions of the resin (ii-1) and the resin (ii-2) are not limited specifically but can be determined as desired according to the purpose. Preferably about 10 to about 90 wt. %, more preferably 30 to 70 wt. %, of the resin iii-1) is usually mixed with about 90 to about 10 wt. %, more preferably 70 to 30 wt. %, of the resin (ii-2) based on the combined weight of the two components.

The resin (iii) having at least two epoxy groups in the molecule is the same as the resin (ii-1).

The crosslinking agent (B) to be admixed with the component (A) for use in the clear coat composition of the invention is a compound having at least two noncyclic acid anhydride group and represented by the following formula.

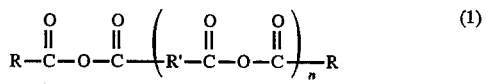 (1)

wherein R, R' and n are as defined above.

This compound can be prepared easily, for example, by reacting a monocarboxylic acid having one carboxyl group in the molecule with a dicarboxylic acid having two carboxyl groups in the molecule for dehydration.

Examples of useful monocarboxylic acids are benzoic acid, methylbenzoic acid, p-tert-butylbenzoic acid and like aromatic monocarboxylic acids; formic acid, acetic acid, propionic acid, butyric acid, caproic acid, caprylic acid, pelargonic acid, isononanoic acid, capric acid, undecanoic acid, lauric acid, myristic acid, palmitic acid, stearic acid, cyclohexanecarboxylic acid, 9-decenoic acid, oleic acid, eleostearic acid, elaidic acid, brassidic acid, linoleic acid, linolenic acid and like saturated or unsaturated aliphatic monocarboxylic acids or alicyclic monocarboxylic acids; etc. Also usable as monocarboxylic acids are coconut oil fatty acid, soybean oil fatty acid, dehydrated castor oil fatty acid, linseed oil fatty acid, safflower oil fatty acid and the like. These examples are usable singly, or at least two of them can be used in combination.

Examples of useful dicarboxylic acids are terephthalic acid, isophthalic acid, phthalic acid, naphthalenedicarboxylic acid, 4,4'-biphenyldicarboxylic acid, diphenylmethane-4,4'-dicarboxylic acid and like aromatic dicarboxylic acids; tetrahydrophthalic acid, hexahydroisophthalic acid, hexahydroterephthalic acid, hexahydrophthalic acid and like alicyclic dicarboxylic acids; adipic acid, sebacic acid, suberic acid, succinic acid, glutaric acid, maleic acid, chloromaleic acid, fumaric acid, dodecanoic diacid, pimelic acid, azelaic acid, itaconic acid, citraconic acid, dimer acid and like aliphatic acids; etc. One of these acids is usable, or at least two of them can be used in combination.

Among these dicarboxylic acids, those wherein the carboxylic groups are attached to adjacent carbon atoms readily undergo a self-cyclization reaction and encounter difficulty in giving the desired crosslinking agent, so that it is desirable not to use them singly. Such dicarboxylic acids are phthalic acid, hexahydrophthalic acid, tetrahydrophthalic acid, succinic acid, maleic acid, chloromaleic acid, etc.

The dehydration reaction between the two components can be conducted at about 80° to about 200° C. To promote this reaction, it is desirable to use a dehydrating agent such as acetic anhydride, acetic acid chloride or phosphorus pentoxide. Although not limited specifically, the amount of the agent to be used is preferably about 2 to about 200 parts by weight per 100 parts by weight of the combined amount of the two components calculated as solids. The reaction ratio of the two components is variable within a range permitting no free carboxyl group to remain in the product as represented by the formula (1). Stated specifically, it is desirable to use about 0.5 to about 250 moles of the dicarboxylic acid per mole of the monocarboxylic acid.

Further some or all of the carboxylic groups of the two components may be converted, for example, to an acid chloride, alkali metal salt or amine salt (primary, secondary, tertiary or quaternary), followed by a desalting reaction to form acid anhydride groups.

With reference to the formula (1), R and R' are each a hydrocarbon group which has 2 to 50 carbon atoms and which may contain an ether linkage, urethane linkage or ester linkage. The hydrocarbon group is introduced into the compound (1) by using the mono-carboxylic acid and dicarboxylic acid.

An ether linkage is introduced into R', for example, by converting the hydroxyl groups at the respective ends of a dihydric alcohol as (poly)etherified to carboxyl groups by oxidation to obtain a dicarboxylic acid polyether having one carboxyl group at each end, and substituting the polyether for a portion or the whole of the dicarboxylic acid or a modified product thereof. On the other hand, an ether linkage is introduced into R, for example, by converting only one hydroxyl group of the (poly)etherified dihydric alcohol to a carboxyl group, with a monohydric alcohol etherified with the other hydroxyl group, to obtain a monocarboxylic acid containing an ether linkage, substituting this acid for a portion or the whole of the monocarboxylic acid to be used and conducting the same reaction as described above. The presence of the ether linkage results in the advantage that the coating obtained on curing can be given high resistance to chemicals.

The dihydric alcohol to be (poly)etherified is a compound having two hydroxyl groups in the molecule. Examples of such alcohols are ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-4,5-pentanediol, 2,2,4-trimethyl-1,3-pentanediol, 1,6-hexanediol, 1,5-hexanediol, 1,4-hexanediol, 2,5-hexanediol, 1,4-cyclohexanedimethanol, neopentyl glycol, bisphenol A, etc. One of these alcohols is usable, or at least two of them can be used in combination.

The polyetherified product can be obtained by subjecting the dihydric alcohol and an alkylene oxide, such as ethylene oxide, propylene oxide or butylene oxide, to an addition reaction.

The monohydric alcohol to be used for forming the group R containing an ether linkage is a compound having one hydroxyl group in the molecule. Examples of such compounds are methyl alcohol, ethyl alcohol, propyl alcohol, butyl alcohol, ethyl butanol, benzyl alcohol, lauryl alcohol, stearyl alcohol, ethylene glycol monomethyl ether, ethylene glycol monoethyl ether, diethylene glycol monomethyl ether, diethylene glycol monoethyl ether, diethylene glycol monobutyl ether and the like. These compounds are usable singly, or at least two of them can be used in combination.

To introduce a urethane linkage into the group R or R' of the formula (1), a polyurethane having an isocyanate group at each of opposite ends is used which is obtained by subjecting a diisocyanate compound and a dihydric alcohol to a urethanization reaction. More specifically, a urethane linkage can be introduced into the group R' by reacting a compound having both hydroxyl and carboxyl in the molecule with the two isocyanate groups of the polyurethane for urethanization to introduce a carboxyl group into each end, and substituting the resulting compound for a portion or the whole of the dicarboxylic acid. Further a urethane linkage can be introduced into the group R by adding a monohydric alcohol to one of the isocyanate groups of the polyurethane, adding a compound having both hydroxyl and carboxyl in the molecule to the other isocyanate group by a urethanization reaction to obtain a monocarboxylic acid, and substituting the acid for a portion or the whole of the monocarboxylic acid stated previously. The presence of the urethane linkage results in the advantage that the coating obtained on curing has high hardness, elasticity and high resistance to water and to chemicals.

The diisocyanate compound mentioned above is a compound having two isocyanate groups in the molecule. Exemplary of such compounds are hexamethylene diisocyanate, trimethylhexamethylene diisocyanate and like aliphatic compounds, hydrogenated xylylene diisocyanate, isophorone diisocyanate, cyclohexane diisocyanate and like alicyclic compounds, tolylene diisocyanate, diphenylmethane diisocyanate and like aromatic compounds. Examples of compounds having both hydroxyl and carboxyl are lactic acid, p-hydroxybenzoic acid, dimethylolpropionic acid, hydroxypivalic acid, ricinoleic acid, 12-hydroxystearic acid, etc. Examples of dihydric alcohols and monohydric alcohols usable are those already mentioned.

An ester linkage can be readily introduced into the group R or R' of the formula (1), for example, by subjecting a monocarboxylic acid having one carboxylic group in the molecule and a low-molecular-weight polyester having two carboxyl groups in the molecule to a dehydration reaction. The presence of an ester linkage entails the advantage of giving a noncrystalline compound which is highly compatible with other resins, permitting the resulting composition to form cured coatings of remarkably improved flexibility and elongation.

Examples of monocarboxylic acids useful for the reaction are aliphatic monocarboxylic acids, alicyclic monocarboxylic acids, coconut oil fatty acid, etc. previously mentioned. Also usable are adducts of a monohydric alcohol with a cyclic acid anhydride. Among these, benzoic acid, isononanoic acid, coconut oil fatty acid and the like are desirable to use.

The low-molecular-weight polyester (up to about 2000, preferably 150 to 1000, in number average molecular weight) having two carboxyl groups in the molecule can be easily prepared, for example, from a dicarboxylic acid and a glycol. Preferred polyesters are those invariably having carboxyl groups and an ester linkage in the molecule and free from other functional groups and linkages.

The dicarboxylic acid to be used in this case is a compound having two carboxyl groups in the molecule or an acid anhydride thereof. Examples of such acids include those previously mentioned, i.e., aromatic dicarboxylic acids or acid anhydrides thereof; alicyclic dicarboxylic acids or acid anhydrides thereof; and aliphatic dicarboxylic acids or acid anhydrides thereof. Among these, preferable to use is one selected from among phthalic anhydride, adipic acid, succinic acid, sebacic acid, etc.

The glycol to be used in this case is a compound having two hydroxyl groups in the molecule. Examples of such compounds are the dihydric alcohols previously mentioned. Among these, preferable to use is one selected from among neopentyl glycol, 1,6-hexanediol, 1,4-butanediol, etc.

The esterification reaction between the dicarboxylic acid and the glycol can be carried out by a known process. The reaction ratio of the two components is variable within such a range that the resulting polyester has two carboxyl groups in total at the respective ends or side chains. More specifically, it is suitable to use about 1.2 to about 2 moles of dicarboxylic acid per mole of glycol.

Instead of using the dicarboxylic acid and the glycol for preparing the low-molecular-weight polyester, it is also possible to use a lactone, such as ε-caprolactone, and the above-mentioned compound having both hydroxyl and carboxyl.

The component (B) of the formula (1) wherein an ester linkage is introduced into R or R' is prepared by subjecting the monocarboxylic acid stated above and the polyester having two carboxyl groups in the molecule to a dehydration reaction. This dehydration reaction can be conducted at about 80° to about 300° C. To promote this reaction, it is desirable to use a dehydrating agent such as acetic anhydride, acetic acid chloride or phosphorus pentoxide. The amount of the agent to be used, although not limited specifically, is preferably about 2 to about 200 parts by weight per 100 parts by weight of the combined amount of the two components calculated as solids. The reaction ratio between the two components is in such a range that no free carboxyl group remains in the resulting product as shown in the formula (1). More specifically, it is desired to use about 0.5 to about 250 moles of the polyester having two carboxyl groups per mole of the monocarboxylic acid. Also in this case, some or all of the carboxyl groups of the two components may be converted, for example, to an acid chloride, alkali metal salt or amine salt (primary, secondary, tertiary or quaternary), followed by a desalting reaction to prepare acid anhydride groups.

The component (B), which is a crosslinking agent, has noncyclic acid anhydride groups and a number average molecular weight which is preferably about 100 to about 50000, more preferably in the range of 300 to 10000, although not limited specifically. The number of acid anhydride groups in the molecule is at least two, more preferably about 2 to about 50, to be suitable.

The curing catalyst (C) is incorporated into the clear coat composition for use in the present invention so as to effect a promoted reaction between the functional groups in the component (A) and the component (B) (e.g., epoxy groups/ hydroxyl groups, acid anhydride groups/epoxy groups, acid anhydride groups/hydroxyl groups/epoxy groups, etc.). Curing catalysts (c) usable are those already known. Examples of such catalysts include triethylamine, tripropylamine, tributylamine and like tertiary amines; amine salts of organic acids; sodium hydroxide and like alkali metal hydroxides; alkali metal salts of organic acids; calcium hydroxide and like alkaline earth metal hydroxides; alkaline earth metal salts of organic acids; tetramethylammonium, tetraethylammonium, tetrapropylammonium, tetrabutylammonium, dimethyldiethylammonium and like quaternary ammoniums and quaternary ammonium salts thereof with chlorine, bromine or the like; benzyltriphenylphosphonium chloride, tetraphenylphosphonium bromide, ethyltriphenylphosphonium bromide, ethyltriphenylphosphonium iodide, tetrabutylphosphonium chloride, tetrabutylphosphonium bromide and like quaternary phosphonium salts; esters of a sulfonic acid, such as benzenesulfonic acid or dodecylbenzenesulfonic acid, and an alcohol, such as propanol or butanol; esters of such a sulfonic acid and an epoxy-containing compound; phosphoric acid mono- or di-esters; esters of phosphoric acid and an epoxy-containing compound, etc.

Although the proportions of the resin (A) and the crosslinking agent (B) for use in the clear coat composition of the present invention can be determined as desired according to the purpose, it is desired to use about 1 to about 1000 parts by weight, preferably 10 to 200 parts by weight, of the component (B) per 100 parts by weight of the component (A).

Further it is suitable to use about 0.01 to about 10 parts by weight of the curing catalyst (C) per 100 parts by weight of the combined amount of the two components (A) and (B) calculated as solids.

The clear coat composition for use in the process of the invention consists essentially of the resin (A), crosslinking agent (B) and curing catalyst (C). When needed, organic solvents, ultraviolet absorbers, photostabilizers, pigments, flowability adjusting agents, particulate polymers and other additives for coating compositions can be admixed with the composition.

Among these, examples of useful ultraviolet absorbers are ethanediamide N-(2-ethoxyphenyl)-N'-(4-isododecylphenyl) and like oxalic acid anilide compounds; 2,2'-[hexamethylenebis(2,2,6,6-tetramethyl-4-piperidinyl)-imino]bis(4,6-diallylamino-1,3,5-triazine) and like triazine compounds; 2,4-dihydroxybenzophenone, 2-hydroxy-4-methoxybenzophenone and like benzophenone compounds; 2-(2'-hydroxy-5'-methylphenyl)benzotriazole and like benzotriazole compounds; etc. Examples of useful photostabilizers are bis(1,2,2,6,6-pentamethyl-4-piperidyl)sebacate and like hindered amine compounds; 8-acetyl-3-dodecyl-7,7,9,9-tetramethyl-1,3,8-triazaspiro(4,5)decane-2,4-dione and like hindered amide compounds, etc. Presence of the ultraviolet absorber and photostabilizer affords greatly improved weather resistance.

To be suitable, the ultraviolet absorber and the photostabilizer are each used in an amount of about 0.1 to about 5 parts by weight, preferably 0.5 to 3 parts by weight, per 100 parts by weight of the combined amount of solids of the two components (A) and (B).

The clear coat composition is usable in the form of a powder coating composition which is completely or almost free from solvent, whereas it is generally desirable to dissolve or disperse the components in an organic solvent to prepare a liquid composition for application.

The organic solvent to be used can be selected as desired according to the purpose. Examples of useful solvents are toluene, xylene, hexane, heptane and like hydrocarbons; methyl ethyl ketone, methyl isobutyl ketone and like ketones; ethyl acetate, propyl acetate, butyl acetate and like esters; propanol, butanol and like alcohols; methyl cellosolve, buty cellosove, methyl carbinol, butyl carbinol, diethylene glycol dimethyl ether and like ethers; etc. These solvents are usable singly, or at least two of them can be used.

The amount of organic solvent to be used in the clear coat composition is so adjusted that the composition to be applied has a solids content of about 30 to 70 wt. %, preferably 40 to 65 wt. %.

The two-coat one-bake overcoating process of the present invention is practiced by applying the base coat composition and the clear coat composition to a substrate and curing the applied compositions in the following manner.

The method of applying the base coat composition is not limited specifically but various known methods are usable. Preferably the composition is applied by electrostatic coating, air spray coating, electrostatic air spray coating, electrostatic rotational atomization coating or like method. To be suitable, the thickness of the coating as cured is about 10 to about 50 μm, preferably about 10 to about 25 μm. The base coat composition applied is dried at room temperature or at a temperature of up to about 100° C. when so required, and further coated with the clear coat composition. The clear coat composition can be applied by the same method as the base coat composition. It is suitable that the thickness of the coating as cured is about 20 to about 120 μm, preferably about 30 to about 70 μm. The two compositions applied are thereafter heated usually at about 120° to about 180° C. for about 20 to about 60 minutes, whereby the two coatings are cured at the same time by crosslinking.

The two-coat one-bake overcoating process of the present invention employs as a clear coat composition a coating composition comprising an epoxy- or epoxy- and hydroxyl-containing resin, a crosslinking agent having noncyclic acid anhydride groups and a curing catalyst. The use of this composition gives cured coatings which are excellent in acid resistance, scratch resistance, weather resistance, chipping resistance, distinctness-of-image gloss, etc.

BEST MODE OF CARRYING OUT THE INVENTION

The present invention will be described in greater detail with reference to the following preparation examples, examples and comparative examples, in which the parts and percentages are by weight as a rule.

Preparation of Base Coat Compositions

Preparation Example 1

Preparation of aqueous dispersion (I)-a of finely particulate acrylic polymer

Into a reactor were placed 70 parts of deionized water, 2.5 parts of 30% "Newcol 707SF" (surfactant manufactured by Nippon Nynkazai Co., Ltd.) and 1 part of a monomer mixture (1) given below. These materials were mixed together by stirring in a nitrogen stream, followed by addition of 3 parts of 3% ammonium persulfate at 60° C. The resulting mixture was then heated to a temperature of 80° C. A monomer emulsion comprising 79 parts of the monomer mixture (1), 2.5 parts of 30% "Newcol 707SF", 4 parts of 3% ammonium persulfate and 42 parts of deionized water was thereafter added to the mixture in the reactor over a period of 4 hours using a metering pump. Completion of the addition was followed by aging for 1 hour.

A monomer emulsion comprising 20.5 parts of a monomer mixture (2) given below, 4 parts of 3% aqueous solution of ammonium persulfate and 30 parts of deionized water was further supplied to the reactor at 80° C. over a period of 1.5 hours using the metering pump, followed by aging for 1 hour. The reaction mixture was cooled to 30° C. and filtered with 200-mesh nylon cloth. Deionized water was added to the filtrate, and the resulting mixture was adjusted to a pH of 7.5 with 2-amino-2 methyl-propanol, giving an aqueous dispersion (I)-a of core/shell-type particulate acrylic polymer having a mean particle size of 0.1 μm and a nonvolatile content of 40%.

| Monomer Mixture (1) | |
|---|---|
| Methyl methacrylate | 55 parts |
| Styrene | 10 parts |
| n-Butyl acrylate | 9 parts |
| 2-Hydroxyethyl acrylate | 5 parts |
| 1,6-Hexanediol diacrylate | 1 part |
| Monomer mixture (2) | |
| Methyl methacrylate | 5 parts |
| n-Butyl acrylate | 7 parts |
| 2-Hydroxyethyl acrylate | 5 parts |
| Methacrylic acid | 3 parts |
| 30% "Newcol 707SF" | 0.5 part |

Preparation Example 2

Preparation of aqueous dispersion (I)-b of finely particulate acrylic polymer

Into a reactor were placed 40 parts of deionized water and 1 part of 30% "Newcol 707SF", which were then mixed together by stirring and heated to a temperature of 80° C. A monomer emulsion comprising 100 parts of a monomer mixture given below, 4 parts of 30% "Newcol 707SE", 4 parts of 3% ammonium persulfate and 100 parts of deionized water was thereafter placed into the reactor over a period of 4 hours, followed by aging for 1 hour. The reaction mixture was subsequently cooled to 30° C. and filtered with 200-mesh nylon cloth. Deionized water was further added to the filtrate, and the resulting mixture was adjusted to a pH of 7.5 with dimethylaminoethanol, giving an aqueous dispersion (I)-b of finely particulate acrylic polymer having a mean particle size of 0.1 μm and a nonvolatile content of 40%.

| Monomer mixture | |
| --- | --- |
| Methyl methacrylate | 60 parts |
| Styrene | 10 parts |
| n-Butyl acrylate | 16 parts |
| 2-Ethylhexyl acrylate | 5 parts |
| 2-Hydroxyethyl acrylate | 5 parts |
| Methacrylic acid | 3 parts |
| 1,6-Hexanediol diacrylate | 1 part |

Preparation Example 3

Preparation of aqueous dispersion (V)-a of modified polyester resin

| Ethylene glycol | 9.2 parts |
| --- | --- |
| Trimethylolpropane | 20.2 parts |
| Tetrahydroxyphthalic anhydride | 13.5 parts |
| Phthalic anhydride | 26.1 parts |
| Coconut oil fatty acid | 31.0 parts |

The above compounds were placed into a reactor and reacted at 230° C. for 9 hours to obtain an alkyd resin having an acid value of 15.0, hydroxyl value of 46.0 and oil length of 33.5%. To the resin were added 4 parts of glycidyl methacrylate and 0.1 part of dimethylamlinoethanol serving as a catalyst, followed by reaction at 130° C. and subsequently by dilution with butyl cellosolve to obtain an alkyd resin solution having a solids content of 60%. The alkyd resin solution (100 parts) was placed into another reactor and maintained at 120° C. The following mixture was then added dropwise to the solution over a period of 3 hours.

| Styrene | 24 parts |
| --- | --- |
| n-Butyl acrylate | 16.8 parts |
| 2-Hydroxyethyl acrylate | 12 parts |
| Acrylic acid | 7.2 parts |
| Benzoyl peroxide | 1.8 parts |

Subsequently, an additional amount of catalyst (benzoyl peroxide) was added dropwise to the resulting mixture for a further reaction. The reaction product thus obtained was neutralized with dimethylaminoethanol. Deionized water was added to the product to obtain an aqueous dispersion (V)-a of modified polyester resin having a nonvolatile content of 30%.

Preparation Example 4

Preparation of aqueous dispersion (V)-b of modified polyester resin

| Ethylene glycol | 29.3 parts |
| --- | --- |
| Trimethylolethane | 6.3 parts |
| Adipic acid | 38.3 parts |
| Isophthalic acid | 26.1 parts |

The above compounds were placed into a reactor and reacted at 230° C. for 8 hours to obtain a polyester resin having an acid value of 10 and a hydroxyl value of 183. To the resin was added 1.5 parts of an isophrone diisocyanate/ 2-hydroxyethyl acrylate adduct (1/1 in mole ratio), followed by reaction at 120° C. for 1 hour and then by dilution with butyl cellosolve to obtain a polyester resin solution having a solids content of 60%. The polyester resin (100 parts) was placed into another reactor and maintained at 120° C. The following mixture was subsequently added to the resin dropwise over a period of 3 hours.

| Styrene | 8 parts |
| --- | --- |
| Methyl methacrylate | 4 parts |
| 2-Ethylhexyl acrylate | 18 parts |
| 2-Hydroxyethyl acrylate | 4 parts |
| Acrylic acid | 6 parts |
| Azobisisobutyronitrile | 0.8 part |

An additional amount of catalyst (azobisisobutyronitrile) was added to the reaction mixture to terminate the reaction. The reaction product was thereafter neutralized with dimethylaminoethanol, and deionized water was added to the product to prepare an aqueous dispersion (V)-b of modified polyester resin having a nonvolatile content of 30%.

Preparation Example 5

Preparation of urethane emulsion (VI)-a

Into a pressure reactor were placed 88.2 parts of polycaprolactone diol (2,000 in molecular weight), 88.2 parts of poly-3-methylpentane adipate diol (2,000 in molecular wight), 6.2 parts of 1,4-butanediol, 4.8 parts of trimethylolpropane, 10.0 parts of dimethylolpropionic acid, 178.6 parts of isophrone diisocyanate and 120 parts of acetone, followed by reaction at 85° C. under an increased pressure for 5 hours. With addition of 6.0 parts of 1,4-butanediol and 150 parts of acetone, the reaction mixture was further reacted at the same temperature for 3 hours. The reaction product was then cooled to 40° C., neutralized with 8.8 parts of diethanolamine and thereafter mixed with 700 parts of ion exchange water. Subsequently, acetone was distilled off from the mixture under a reduced pressure at a temperature of up to 70° C. to give 949 parts of a urethane resin emulsion (VI)-a having a solids content of 31.6%, viscosity of 250 cps/25° C. and pH of 9.4.

Preparation Example 6

Preparation of urethane emulsion (VI)-b

Into a pressure reactor were placed 69.6 parts of polycarbonate diol (2,000 in molecular weight), 69.6 parts of poly-3-methylpentane adipate diol (2,000 in molecular wight), 2.6 parts of trimethylolpropane, 37.7 parts of an adduct of bisphenol A with 2 moles of ethylene oxide (330 in molecular wight), 8.6 parts of dimethylolpropionic acid, 192.0 parts of isophrone diisocyanate and 120 parts of acetone, which were then reacted at 85° C. for 5 hours to obtain a prepolymer solution having a terminal NCO content of 2.68%. The solution was thereafter cooled to 35° C., a mixture of 8.3 parts of aminoethylethanolamine, 30 parts of isopropanol and 120 parts of acetone was added to the solution, and the resulting mixture was reacted for 1 hour. Subsequently, the reaction product was mixed with 700 parts of ion exchange water containing 15.0 parts of diethanolamine, and the solvent was distilled off from the mixture in the same manner as in Preparation Example 1 to obtain 997 parts of a urethane resin emulsion (VI)-b having a solids content of 30.1%, viscosity of 350 cps/25° C. and pH of 9.4.

Preparation Example 7

Preparation of urethane emulsion (VI)-c

Into a polymerization reactor were placed 115.5 parts of polybuthylene adipate having a number average molecular weight of 2,000,115.5 parts of polycaprolactone diol having a number average molecular weight of 2,000, 23.2 parts of dimethylolpropionic acid, 6.5 parts of 1,4-butanediol and 120.1 parts of 1-isocyanato-3-isocyanatomethyl-3,5,5-trimethylcyclohexane (IPDI), which were then reacted in a nitrogen gas atmosphere with stirring at 85° C. for 7 hours to obtain a prepolymer having termianl NCO and 4.0% in NCO content. Subsequently, the prepolymer was cooled to 50° C. and made into a uniform solution with 165 parts of acetone. Triethylamine (15.7 parts) was thereafter added to the solution with stirring, 600 parts of ion exchange water was added to the mixture while maintaining the mixture at a temperature of up to 50° C. to obtain an aqueous dispersion, and the dispersion was maintained at 50° C. for 2 hours to complete a chain extension reaction with water. The acetone was distilled off from the resulting dispersion in a vacuum at not higher than 70° C., giving 944 parts of a urethane resin emulsion (VI)-c having a solids content of 42.0%.

Preparation Example 8

Preparation of base coat composition (M-1)

A base coat composition (M-1) having a viscosity of 1,500 mPas as determined by a Brookfield viscometer, No. 3 rotor and a solids content of 30% was prepared by stirring the following mixture.

| | |
|---|---|
| Aqueous dispersion (I)-a Prep. Ex. 1 | 188 parts |
| UBAN 28-60 (*1) | 25 parts |
| Cymel 370 (*2) | 11 parts |
| Primal ASE-60 (*3) | 1 part |
| Dimethylaminoethanol | 0.5 part |
| Aluminum pigment paste | 20 parts |
| Butyl cellosolve | 25 parts |
| Deionized water | 250 parts |

(*1) An aqueous dispersion of melamine resin prepared by placing 25 parts (calculated as solids) of a hydrophobic melamine resin, UBAN 28-60 (product of Mitsui Toatsu Chemicals, Inc. 60% in nonvolatile content, 0.4 in solvent dilution ration and 3,000 to 4,000 in weight average molecular weight), into a reactor, adding 20 parts of 50% aqueous solution of acrylic resin to the melamine resin and slowly adding deionized water to the mixture with stirring to a solids concentration of 60%, the acrylic resin solution being prepared by copolymerizing 26 parts of n-butyl acrylate, 47 parts of methyl methacrylate, 10 parts of styrene, 10 parts of 2-hydroxyethyl methacrylate and 6 parts of acrylic acid to obtain an acrylic resin (48 in acid value), neutralizing the resin with an alkali and dissolving the resin in water.
(*2) Cymel 370: brand name, hydrophilic methyletherified melamine resin solution manufactured by Mitsui Cyanamide and having a solids content of 88%.
(*3) Primal ASE-60: brand name, acrylic resin emulsion (thickener) manufactured by Japan Acrylic Chemical Co., Ltd., and having a solids content of 28%.

Preparation Example 9

Preparation of base coat composition (M-2)

A base coat composition (M-2) having a viscosity of 1,500 mPas as determined by a Brookfield viscometer, No. 3 rotor and a solids content of 19% was prepared by stirring the following mixture.

| | |
|---|---|
| Aqueous dispersion (I)-a of Prep. Ex. 1 | 162.0 parts |
| Aqueous solution of acrylic resin (*4) | 20.0 parts |
| Melamine resin (*5) | 42.0 parts |
| Thickener (*6) | 5.0 parts |
| 50% Tinuvin 1130 (*7) | 1.3 parts |

-continued

| | |
|---|---|
| 10% Acrylic thickener resin (*8) | 8.7 parts |
| Aluminum flake dispersion (*9) | 27.0 parts |
| Deionized water | 192 parts |

The composition was adjusted to a pH of 7.6 with 2-amino-2-methyl propanol.
(*4) The acrylic resin aqueous solution is an acrylic copolymer of methyl methacrylate, butyl acrylate, hydroxyethyl acrylate and acrylic acid neutralized with 2-amino-2-methyl propanol. The acid number is 30 and the hydroxy equivalent weight is 813. It is 50% solids in 80% butyl cellosolve, 10% water and 10% isopropanol.
(*5) The melamine resin is a melamine-formaldehyde-butanol condensation product with 5 combined formaldehyde and 2.5 combined butanol with a degree of polymerization of 2.1. It is 60% solids in butanol.
(*6) The thickener is a urethane resin, "Borchigel L-75", product of Miles Corp.
(*7) Butyl cellosolve solution, product of Ciba-Geigy Corp.
(*8) ASE-60, product of Rohm and Haas Co.
(*9) 11% Aluminum flakes, 13% dispersion resin and 2% passivator.

Preparation Example 10

Preparaton of base coat composition (M-3)

A base coat composition (M-3) having a viscosity of 1,500 mPas as determined by a Brookfield viscometer, No. 3 rotor and a solids content of 30% was prepared by stirring the following mixture.

| | |
|---|---|
| Aqueous dispersion (I)-a of Prep. Ex. 1 | 75 parts |
| Aqueous dispersion (V)-a of Prep. Ex. 3 | 150 parts |
| UBAN 28-60 (*1) | 25 parts |
| Cymel 370 (*2) | 11 parts |
| Primal ASE-60 (*3) | 1 part |
| Dimethylaminoethanol | 0.5 part |
| Aluminum paste | 20 parts |
| Butyl cellosolve | 25 parts |
| Deionized water | 250 parts |

The note symbols (*1) to (*3) each have the same meaning as above.

Preparation Example 11

Preparation of base coat composition (M-4)

A base coat composition (M-4), 1500 mPas in viscosity and 30% in solids content, was prepared in the same manner as in Preparation Example 10 except that the aqueous dispersion (V)-a of polyester resin used for the base coat composition (M-3) of Preparation Example 10 was replaced by the same amount of the aqueous dispersion (V)-b of modified polyester resin of Preparation Example 4.

Preparation Example 12

Preparation of base coat composition (M-5)

A base coat composition (M-5) having a viscosity of 1,200 mPas as determined by a Brookfield viscometer, No. 3 rotor and a solids content of 30% was prepared by stirring the following mixture.

| | |
|---|---|
| Aqueous dispersion (I)-b of Prep. Ex. 2 | 25 parts |
| Aqueous dispersion (V)-b of Prep. Ex. 4 | 217 parts |
| UBAN 28-60 (*1) | 25 parts |
| Cymel 370 (*2) | 11 parts |
| Primal ASE-60 (*3) | 2 parts |
| Dimethylaminoethanol | 0.7 part |
| Aluminum paste | 20 parts |

| Butyl cellosolve | 25 parts |
| Deionized water | 210 parts |

The note symbols (*1) to (*3) each have the same meaning as above.

Preparation Example 13

Preparation of base coat composition (M-6)

A base coat composition (M-6), 2,000 mPas in viscosity and 30% in solids content, was prepared in the same manner as in Preparation Example 10 except that the melamine resin, UBAN 28-60, used in Preparation Example 10 was replaced by the same amount of a hydrophilic melamine resin, Cymel 325 (product of Mitsui Cyanamide Co., Ltd.).

Preparation Example 14

Preparation of base coat composition (M-7)

A base coat composition (M-7), 1,500 mPas in viscosity and 30% in solids content, was prepared in the same manner as in Preparation Example 12 except that the aqueous dispersion (V)-b of polyester resin used for the base coat composition (M-5) of Preparation Example 12 was replaced by the same amount of the urethane emulsion (VI)-a of Preparation Example 5.

Preparation Example 15

Preparation of base coat composition (M-8)

A base coat composition (M-8), 1,500 mPas in viscosity and 30% in solids content, was prepared in the same manner as in Preparation Example 12 except that the aqueous dispersion (V)-b of polyester resin used for the base coat composition (M-5) of Preparation Example 12 was replaced by the same amount of the urethane emulsion (VI)-b of Preparation Example 6.

Preparation Example 16

Preparation of base coat composition (M-9)

A base coat composition (M-9), 1,500 mPas in viscosity and 30% in solids content, was prepared in the same manner as in Preparation Example 12 except that the aqueous dispersion (V)-b of polyester resin used for the base coat composition (M-5) of Preparation Example 12 was replaced by the same amount of the urethane emulsion (VI)-c of Preparation Example 7.

Preparation of Clear Coat Compositions

Preparation of Resins (A)

Preparation Example 17

(A-1): Epoxy- and hydroxyl-containing resin

An acrylic resin solution containing 50 wt. % of solids (solvent: xylol) was prepared from 1 mole of glycidyl methacrylate, 1 mole of 2-hydroxyethyl acrylate and 5.2 moles of n-butyl methacrylate. The acrylic resin was about 5000 in number average molecular weight and contained about 5 epoxy groups per molecule and about 5 hydroxyl groups per molecule.

Preparation Example 18

(A-2): Epoxy- and hydroxyl-containing resin

An acrylic resin solution containing 50 wt. % of solids (solvent: xylol) was prepared from 3 moles of glycidyl methacrylate, 1 mole of hydroxypropyl methacrylate, 2 moles of styrene and 1 mole of n-butyl acrylate. The acrylic resin was about 5000 in number average molecular weight and contained about 15 epoxy groups in the molecule and about 5 hydroxyl groups in the molecule.

Preparation Example 19

(A-3): Epoxy-containing resin

An acrylic resin solution containing 50 wt. % of solids (solvent: xylol) was prepared from 2 moles of 3,4-epoxycyclohexylmethyl methacrylate and 4.2 moles of n-butyl methacrylate. The acrylic resin was about 6000 in number average molecular weight and contained about 12 epoxy groups in the molecule.

Preparation Example 20

(A-4): Epoxy-containing resin

An acrylic resin solution containing 50 wt. % of solids was prepared by reacting monomers, i.e., 2 moles of glycidyl methacrylate and 5 moles of n-butyl methacrylate, in xylol. The acrylic resin was about 20000 in number average molecular weight and contained about 40 epoxy groups in the molecule.

Preparation Example 21

(A-5): Hydroxyl-containing resin

An acrylic resin solution containing 50 wt. % of solids (solvent: xylol) was prepared from 2 moles of 2-hydroxyethyl acrylate and 5.4 moles of n-butyl methacrylate. The acrylic resin was about 6000 in number average molecular weight and contained about 12 hydroxyl groups in the molecule.

Preparation of Crosslinking Agents (B)

Preparation Example 22

(B-1): Compound of the formula (1) wherein R is a monovalent hydrocarbon group with 6 carbon atoms and R' is a bivalent hydrocarbon group with 4 carbon atoms, with about 6 noncyclic acid anhydride groups present in the molecule A crosslinking agent (B-1) was prepared by mixing together 5 moles of adipic acid, 2 moles of benzoic acid and 10 moles of acetic anhydride, reacting the monomers at 140° C. while removing acetic acid as a by-product, heating the mixture to 160° C. when acetic acid ceased flowing out and removing an excess of acetic anhydride to terminate the reaction. The agent was P in Gardner viscosity (20° C.) and about 800 in number average molecular weight as determined by GPC (gel permeation chromatography).

Preparation Example 23

(B-2): Compound of the formula (1) wherein R is a monovalent hydrocarbon group with 6 carbon atoms and R' is a bivalent hydrocarbon group with 7 or 4 carbon atoms, with about 20 noncyclic acid anhydride groups present in the molecule Azelaic acid chloride (9 moles), 10 moles of ammonium adipate and 2 moles of benzoic acid chloride were mixed together, and the mixture was reacted at a temperature of up to 20° C. for 1 hour. Ammonium chloride formed as a by-product was removed to obtain a crosslinking agent (B-2). The agent was Zl in Gardner viscosity and about 1400 in number average molecular weight as determined by GPC.

Preparation Example 24

(B-3): Compound of the formula (1) wherein R is a monovalent hydrocarbon group with 6 carbon atoms and R' is a bivalent hydrocarbon group containing an ether linkage and having 4 carbon atoms, with about 21 noncyclic acid anhydride groups present in the molecule A crosslinking agent (B-3) was prepared by mixing together 20 moles of a compound represented by the formula HOOC—CH$_2$CH$_2$—O—CH$_2$CH$_2$—COOH, 2 moles of benzoic acid and 40 moles of acetic anhydride, reacting the mixture at 140° C. while removing acetic acid as a by-product, heating the mixture to 160° C. when acetic acid ceased flowing out and removing an excess of acetic anhydride to terminate the reaction. The agent was Z in Gardner viscosity (20° C.) and about 1400 in number average molecular weight as determined by GPC.

Preparation Example 25

(B-4): Compound of the formula (1) wherein R is a monovalent hydrocarbon group with 8 carbon atoms and R' is a bivalent hydrocarbon group containing a urethane linkage and having 22 carbon atoms, with about 11 noncyclic acid anhydride groups present in the molecule A crosslinking agent (B-4) was prepared by mixing together 10 moles of a compound represented by the formula

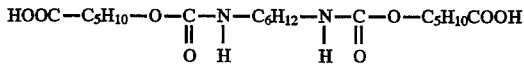

2 moles of isononanoic acid and 20 moles of acetic anhydride, heating the mixture at 140° C. while removing acetic acid as a by-product, heating the mixture to 160° C. when acetic acid ceased flowing out and removing an excess of acetic anhydride to terminate the reaction. The agent was in the form of a white solid. When the product was made into a solution containing about 90 wt. % of solids with methyl isobutyl ketone, the solution was Z3 in Gardner viscosity (20° C.) and about 2500 in number average molecular weight as determined by GPC.

Preparation Example 26

(B-5): Compound of the formula (1) wherein R is a monovalent hydrocarbon group with 18 carbon atoms and R' is a bivalent hydrocarbon group with 4 carbon atoms, with about 11 noncyclic acid anhydride groups present in the molecule Ten moles of adipic acid was heated to 400° C., and water flowing out was removed, whereupon 2 moles of dehydrated castor oil fatty acid was added to the reaction mixture, followed by a further reaction at 200° C. for 4 hours to obtain a crosslinking agent (B-5). The agent was N in Gardner viscosity (20° C.) and about 2000 in number average molecular weight as determined by GPC.

Preparation Example 27

(B-6): Compound of the formula (1) wherein R is a monovalent hydrocarbon group with 6 carbon atoms and R' is a bivalent hydrocarbon group containing an ester linkage and having 40 carbon atoms, with about 2 noncyclic acid anhydride groups present in the molecule A crosslinking agent (B-6) was obtained by preparing a linear polyester resin (about 960 in number average molecular weight) having terminal carboxyl and comprising 5 moles of adipic acid and 4 moles of neopentyl glycol, mixing 2 moles of benzoic acid and 3 moles of acetic anhydride with the resin, reacting the mixture at 140° C. while removing acetic acid as a by-product, heating the mixture to 160° C. when acetic acid ceased flowing out and removing an excess of acetic anhydride to terminate the reaction. The agent was K in Gardner viscosity (20° C.) and about 350 in number average molecular weight as determined by GPC.

Preparation Example 28

(B-7): Compound of the formula (1) wherein R is a monovalent hydrocarbon group with 8 carbon atoms and R' is a bivalent hydrocarbon group containing an ester linkage and having 42 carbon atoms, with about 6 noncyclic acid anhydride groups present in the molecule A crosslinking agent (B-7) was obtained by preparing a linear polyester resin having terminal carboxyl and comprising 20 moles of phthalic anhydride and 15 moles of 1,6-hexanediol, mixing 2 moles of isononanoic acid and 10 moles of acetic anhydride with the resin and reacting the mixture in the same manner as in preparing the agent (B-6). The agent was Z in Gardner viscosity and about 2000 in number average molecular weight.

Preparation Example 29

(B-8): Compound of the formula (1) wherein R is a monovalent hydrocarbon group with 12 carbon atoms and R' is a bivalent hydrocarbon group containing an ester linkage and having 40 carbon atoms, with about 11 noncyclic acid anhydride groups in the molecule A crosslinking agent (B-8) was obtained by mixing 2 moles of coconut oil fatty acid and 15 moles of acetic anhydride with 10 moles of a linear polyester having a molecular weight of 1000 and terminal carboxyl and prepared by reacting ε-caprolactone with lactic acid, and reacting the mixture in the same manner as in preparing the agent (B-6). The agent was S in Gardner viscosity and about 3000 in number average molecular weight as determined by GPC.

Preparation Example 30

Preparation of Clear Coat Compositions T-1 to T-8

The resins (A) obtained in Preparation Examples 17 to 21, the crosslinking agents (B) obtained in Preparation Examples 22 to 29, curing catalysts (C) and ultraviolet absorbers (D) were mixed together in specified combinations and in specified proportions as listed in Table 1 below. Clear coat compositions T-1 to T-8 were prepared from the respective mixtures by adjusting each mixture to a solids content of about 40 wt. % with an organic solvent mixture (xylol/"Solvesso #150" (brand name, aromatic hydrocarbon solvent manufactured by Esso Oil Co., Ltd.)=1/1 in weight ratio).

TABLE 1

| Clear coat comp. | Resin (A) | | Crosslinking agent (B) | | Curing catalyst (C) | | Ultraviolet absorber (D) | |
|---|---|---|---|---|---|---|---|---|
| | kind | Amount | kind | Amount | kind | Amount | kind | Amount |
| T-1 | (A-1) | 100 | (B-1) | 20 | (C-1) | 2 | (D-1) | 2 |
| T-2 | (A-2) | 100 | (B-2) | 30 | (C-1) | 2 | (D-1) | 2 |
| T-3 | (A-3) (A-5) | 40 60 | (B-3) | 40 | (C-1) | 2 | (D-1) | 2 |
| T-4 | (A-4) (A-5) | 60 40 | (B-4) | 50 | (C-2) | 2 | (D-2) | 2 |
| T-5 | (A-1) (A-5) | 50 50 | (B-5) | 100 | (C-2) | 2 | (D-2) | 2 |
| T-6 | (A-2) | 100 | (B-6) | 70 | (C-3) | 2 | (D-3) | 2 |
| T-7 | (A-3) | 100 | (B-7) | 80 | (C-3) | 2 | (D-3) | 2 |
| T-8 | (A-4) | 100 | (13-8) | 100 | (C-3) | 2 | (D-3) | 2 |

The amounts, components (C) and components (D) listed in Table 1 are as follows.
1) The amounts are all in parts by weight, calculated as solids.
2) The symbols identifying the respective curing catalysts (C) stand for the following.
(C-1): Tetramethylammonium chloride
(C-2): Tributylamine
(C-3): Benzyltriphenylphosphonium chloride
3) The symbols identifying the respective ultraviolet absorbers stand for the following.
(D-1): Ethanediamide N-(2-ethoxyphenyl)-N'-(4-isododecylphenyl)
(D-2): 2,4-Dihydroxybenzophenone
(D-3): 2-(2'-hydroxy-5'-methylphenyl)benzotriazole Examples 1–9 and Comparative Examples 1–3

"Elecron No. 9400" (brand name, cationic electrophoretic coating composition manufactured by Kansai Paint Co., Ltd.) was electrophoretically applied to steel panels to a thickness, as cured, of 20 μm and heated at 170° C. for 30 minutes for curing. Subsequently, "ES Primer Surfacer TP-37" (brand name, intermediate coating composition manufactured by Kansai Paint Co., Ltd.) was sprayed onto the steel panels over the coating to a thickness, as cured, of 30 μm and heated at 140° C. for 30 minutes for curing. The steel panels thus coated were used as substrates.

Some of the substrates were overcoated by the two-coat one-bake method wherein the base coat composition and the clear coat composition prepared in Preparation Examples were applied wet-on-wet and then cured by heating.

The same procedure as above was repeated using different base coat compositions and clear coat compositions as listed in Table 2 below. The two types of the coating compositions were applied by the electrostatic rotational atomization method to form a base coat and a clear coat having a thickness of about 20 μm and about 35 μm, respectively, when cured. Each substrate was allowed to stand at room temperature for about 5 minutes after the application of the base coat composition, then coated with the clear coat composition, heated at 140° C. for 30 minutes to cure the compositions at the same time and thereby overcoated.

TABLE 2

| | Example | | | | | | | | | Comp. Ex. | | |
|---|---|---|---|---|---|---|---|---|---|---|---|---|
| | 1 | 2 | 3 | 4 | 5 | 6 | 7 | 8 | 9 | 1 | 2 | 3 |
| Base coat composition | M-1 | M-2 | M-3 | M-4 | M-5 | M-6 | M-7 | M-8 | M-9 | M-1 | M-2 | M-6 |
| Clear coat composition | T-1 | T-1 | T-2 | T-3 | T-4 | T-5 | T-6 | T-7 | T-8 | X | Y | Z |

The comparative clear coat compositions X, Y and Z listed in Table 2 are as follows.

The clear coat composition X corresponds to the clear coat composition T-1 wherein the crosslinking agent (B-1) is replaced by the same amount of a resin (22000 in weight average molecular weight) having a cyclic acid anhydride group and prepared by copolymerizing n-butyl acrylate, styrene and maleic anhydride (16% in content).

The clear coat composition Y corresponds to the clear coat composition T-1 wherein the crosslinking agent (B-1) is replaced by the same amount of a free carboxyl-containing resin (22000 in weight average molecular weight) prepared by copolymerizing n-butyl acrylate, styrene and maleic acid (16% in content).

The clear coat composition Z corresponds to the clear coat composition T-1 wherein the crosslinking agent (B-1) is replaced by the same amount of methylhexahydrophthalic acid anhydride.

The cured coatings thus obtained by the two-coat one-bake method were tested for properties by the following methods.

Test Methods

Appearance on finishing: The coating was visually evaluated according to the criteria of: A, satisfactory in smoothness and gloss; B, slightly poor in smoothness and gloss; C, very poor in smoothness and gloss.

Distinctness-of-immage gloss: The coating was checked for ICM value by an image clarity meter (product of Suga Shikenki Co., Ltd.). ICM values are in the range of 0 to 100

(%). ICM values not lower than 80 indicate an excellent distinctness-of-image gloss.

Acid resistance: A 0.4 ml quantity of 40% aqueous solution of sulfuric acid was applied dropwise to the coating, which was then dried at 60° C. for 15 minutes with a hot air dryer, thereafter washed with water and visually evaluated according to the criteria of: A, free of any whitening, staining or etching; B, slight whitening, staining or etching; C, marked whitening, staining or etching.

Solvent resistance: The coating was rubbed with gauze wet with xylol 10 times and then visually evaluated according to the criteria of: A, no change; B, noticeable scratches; C, noticeable swelling and whitening.

Scratch resistance: A motor vehicle having the test piece affixed to its roof was washed 5 times by a car washing machine, "PO2OFWRC," product of Yasui Sangyo Co., Ltd., and the coating of the test piece was then checked and evaluated according to the criteria of: A, almost free from sratches; B, noticeable sratches; C, marked starches.

Weather resistance: Determined by a QUV accelerated weather test using an accelerated weathering tester, product of Q Panel Co., Ltd. The coating was irradiated with UV rays at 60° C. for 16 hours and then exposed to condensation water at 50° C. for 9 hours as one cycle. After repeating this cycle for 3000 hours, the coating was evaluated according to the criteria of: A, almost remaining unchanged in gloss; B, appreciable reduction in gloss; C, marked reduction in gloss along with cracking or whitening.

Chipping resistance: The coating was tested by a QGR gravelometer (product of Q Panel Co., Ltd.). About 100 ml of gravel in the form of crushed stones, 5 to 10 mm in diameter, was forced against the coating at an air pressure of about 4 kg/cm² at a temperature of about −20° C. at a panel angle of 45 deg. The coating was then evaluated according to the criteria of: A, slightly noticeable flaws due to impact, but no separation of the intermediate coat; B, an increased number of flaws due to impact with slightly noticeable separation of the intermediate coat; C, many flaws due to impact, with noticeable separation of the intermediate coat.

Adhesion: The coating was checked by a cross-cut adhesion test. An adhesive cellophane tape was affixed to the coating having 100 2×2 mm squares formed by cutting and then forcibly peeled off. The number of squares remaining on the panel was thereafter counted. The adhesion was evaluated according to the criteria of: A, at least 95 squares remaining unremoved; B, removal of 6 to 10 squares; C, removal of at least 11 squares.

Table 3 below shows the results.

We claim:

1. A process for forming an overcoat by the two-coat one-bake method wherein a base coat composition and a clear coat composition are applied to a substrate wet-on-wet and thereafter cured at the same time by heating, the process being characterized in that the base coat composition is an aqueous coating composition comprising:
(I) an aqueous dispersion or solution of a polymer containing a crosslinkable functional group,
(II) a crosslinking agent,
(III) a coloring pigment, and
(IV) water,
the clear coat composition being a coating composition comprising:
(A) at least one resin selected from the group consisting of (i) a resin having at least one epoxy group and at least one hydroxyl group in the molecule, (ii) a resin mixture of (ii-1) a resin having at least two epoxy groups in the molecule and (ii-2) a resin having at least two hydroxyl groups in the molecule, (iii) a resin having at least two epoxy groups in the molecule, and (iv) any mixture thereof,
(B) a crosslinking agent comprising a compound having at least two noncyclic acid anhydride groups and represented by the formula

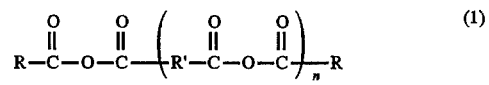

(1)

wherein R is a monovalent hydrocarbon group having 2 to 50 carbon atoms, R' is a bivalent hydrocarbon group having 2 to 50 carbon atoms, the hydrocarbon groups R and R' containing or not containing an ether linkage, urethane linkage or ester linkage, and n is an integer of 1 to 500, and
(C) a curing catalyst.

2. A process as defined in claim 1 wherein (I) is an aqueous dispersion of a particulate acrylic polymer containing a crosslinkable functional group.

3. A process as defined in claim 1 wherein the base coat composition comprises, calculated as solids, 10 to 70 parts by weight of the crosslinking agent (II) and 2 to 200 parts by weight of the coloring pigment (III) per 100 parts by weight of the aqueous dispersion (I).

4. A process as defined in claim 1 wherein the base coat composition has further incorporated therein a modified polyester resin (V).

5. A process as defined in claim 1 wherein the base coat composition has further incorporated therein a urethane resin emulsion (VI).

TABLE 3

| | Example | | | | | | | | | Comp. Ex. | | |
|---|---|---|---|---|---|---|---|---|---|---|---|---|
| | 1 | 2 | 3 | 4 | 5 | 6 | 7 | 8 | 9 | 1 | 2 | 3 |
| Appearance on finishing | A | A | A | A | A | A | A | A | A | B | B | A |
| Distinctness-of-image gloss | 92 | 92 | 94 | 96 | 96 | 95 | 90 | 89 | 92 | 74 | 75 | 80 |
| Acid resistance | A | A | A | A | A | A | A | A | A | B | B | B |
| Solvent resistance | A | A | A | A | A | A | A | A | A | A | A | B |
| Scratch resistance | B | A | A | A | A | A | A | B | B | C | C | C |
| Weather resistance | A | A | A | A | A | A | A | A | A | A | A | B |
| Chipping resistance | B | B | B | B | A | A | A | A | A | C | C | C |
| Adhesion | A | A | A | A | A | A | A | A | A | A | A | A |

6. A process as defined in claim 1 wherein the resin (i) for use in the clear coat composition has 2 to 50 epoxy groups and 2 to 50 hydroxyl groups in the molecule.

7. A process as defined in claim 1 wherein the resin (ii-1) for use in the clear coat composition has 2 to 50 epoxy groups in the molecule.

8. A process as defined in claim 1 wherein the resin (ii-2) for use in the clear coat composition has 2 to 50 hydroxyl groups in the molecule.

9. A process as defined in claim 1 wherein the resin (iii) for use in the clear coat composition has 2 to 50 epoxy groups in the molecule.

10. A process as defined in claim 1 wherein the crosslinking agent (B) for use in the clear coat composition has about 2 to about 50 noncyclic acid anhydride groups in the molecule.

11. A process as defined in claim 1 wherein the ratio of (B) to (A) in the clear coat composition is about 1 to about 1000 parts by weight of (B) per 100 parts by weight of (A).

12. A process as defined in claim 1 wherein the proportion of (C) in the clear coat composition is about 0.01 to about 10 parts by weight per 100 parts by weight of the combined amount of solids of (A) and (B).

13. A process as defined in claim 1 wherein the clear coat composition further has an ultraviolet absorber incorporated therein.

14. An article coated by an overcoat forming process as defined in claim 1.

* * * * *